United States Patent [19]

Cook

[11] 4,119,341

[45] Oct. 10, 1978

[54] REAR WINDOW ASSEMBLY FOR A TRUCK CAB

[76] Inventor: Eddie G. Cook, 5727 W. Wilshire, Phoenix, Ariz. 85035

[21] Appl. No.: 858,610

[22] Filed: Dec. 8, 1977

[51] Int. Cl.² .............................................. B60J 5/10
[52] U.S. Cl. ..................................... 296/146; 49/348; 49/351
[58] Field of Search ............... 296/146, 23 MC, 28 C; 49/348, 349, 351, 373, 378

[56] References Cited

U.S. PATENT DOCUMENTS

| | | | |
|---|---|---|---|
| 2,926,040 | 2/1960 | Kramer | 296/146 |
| 3,004,448 | 10/1961 | Wanlass | 49/351 |
| 3,684,048 | 8/1972 | Prater | 296/23 MC |
| 3,770,312 | 11/1973 | Shadburn | 296/146 |

*Primary Examiner*—Robert R. Song
*Attorney, Agent, or Firm*—Herbert E. Haynes, Jr.

[57] ABSTRACT

A window channel assembly and a mechanism closure panel are mounted internally of a truck cab for rigidification thereof, and for supportingly carrying a window which is vertically movable in a window opening formed in the rear panel of the cab. The window is remotely movable by means of power operated regulator that is carried on an upstanding support panel affixed to the floor of the truck cab.

8 Claims, 4 Drawing Figures

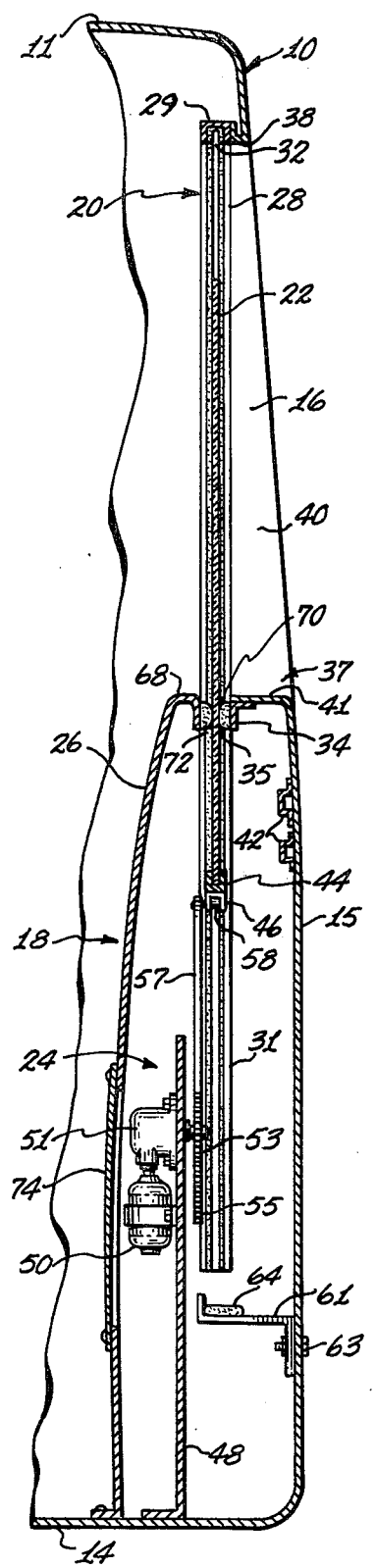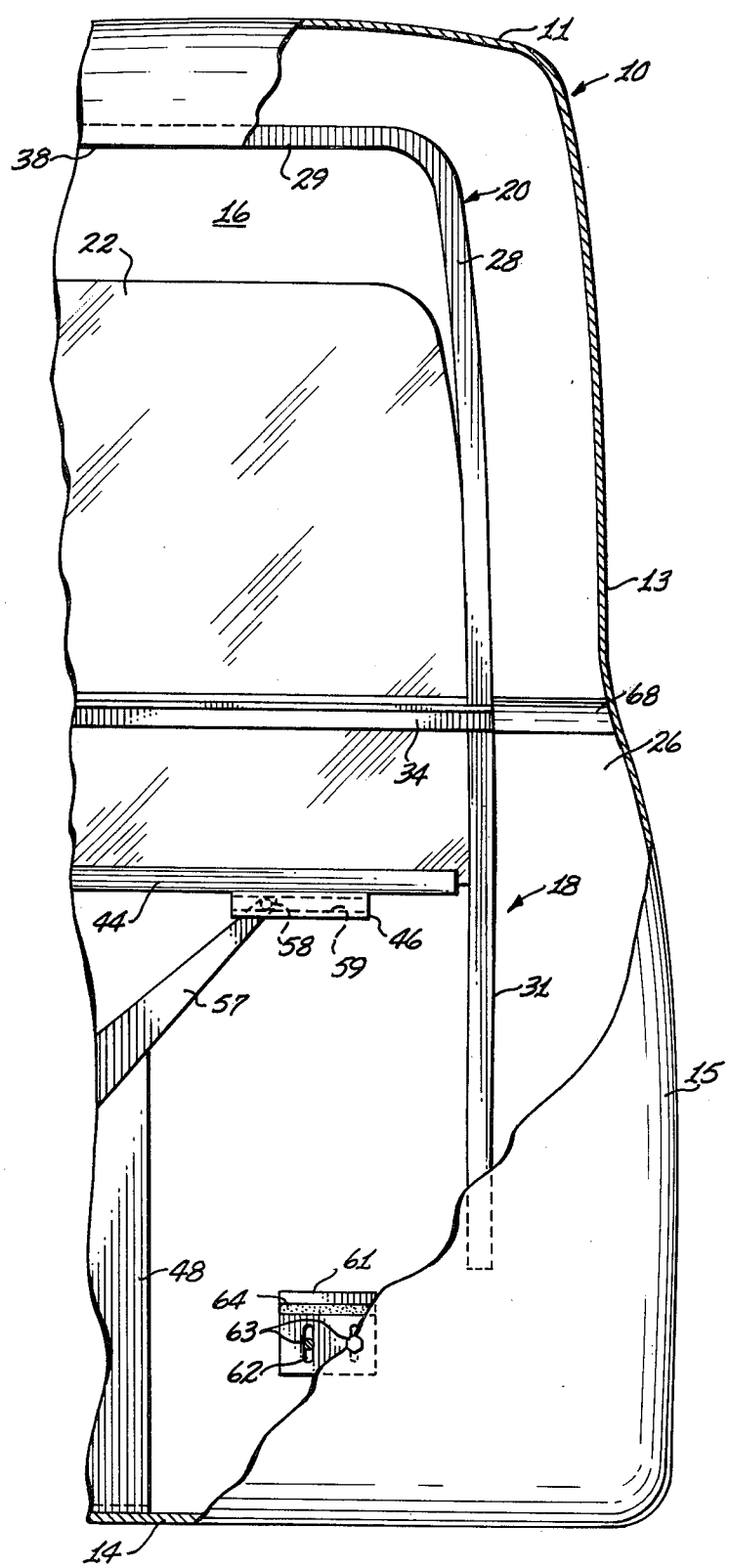

REAR WINDOW ASSEMBLY FOR A TRUCK CAB

BACKGROUND OF THE INVENTION

1. Field of the Invention

This invention relates to vehicular windows, and more particularly to a power operated rear window assembly for a truck cab.

2. Description of the Prior Art

It has become increasingly popular with sportsmen, vacationers, and the like in recent years to mount a housing or enclosure, sometimes referred to as a camper, on the bed of a pickup or other type of light duty truck. These campers are most often utilized for living purposes and particularly as a shelter providing a place to sleep and store provisions. A common type of camper now in widespread use, is a generally rectangular structure which is mounted on the bed of the pickup truck to the rear of the cab thereof. This type of camper is provided with a forward wall which extends vertically in close proximity to the vertically extending rear panel of the truck cab.

This arrangement has shown the need for communication between the interior of the truck cab and the interior of the camper, and this is often accomplished by removing the rear window of the cab entirely and providing an aligned window opening in the forward wall of the camper so that the occupants of the cab and the camper may see each other through these openings, and may converse, and, if desired, pass various articles back and forth between the two enclosed spaces.

Providing a communication passage between the truck cab and the camper enclosure poses problems from several standpoints. For example, complete removal of the truck's rear window presents a problem in that temporary or periodic removal of the camper leaves a gaping hole in the rear panel of the truck which cannot be closed short of reinstalling the rear window which is no menial task. Another problem with removal of the truck's rear window is that it is oftentimes desirable to close the passage between the cab and the camper for noise, isolation purposes. to prevent exchanges of heat or cooling therebetween, and the like.

These problems resulting from complete removal of the truck's rear window has prompted the replacement of the fixed window with a laterally sliding window assembly. Although easing the problems a great deal, the sliding window assembly has not completely solved all of the problems in that a sliding window assembly inherently cannot provide an opening which is larger than one half of the total window area. Thus, the communication passage between the truck's cab and camper is limited in size.

Another problem arising from the use of a sliding window assembly in the rear of a truck's cab is the lack of operating convenience and safety. The operator of the vehicle cannot safely open and/or close the sliding window assembly while driving in that the window is behind him which necessitates taking at least one hand off of the vehicle's steering wheel, twisting in the seat, and many times in opening or closing such a window assembly, the operator will take his eyes off of the road on which he is travelling.

Therefore, a need exists for a new and improved rear window assembly for a truck cab which overcomes some of the problems and shortcomings of the prior art.

SUMMARY OF THE INVENTION

In accordance with the present invention, a new and useful power operated rear window assembly is disclosed for use in a truck cab.

The rear window assembly of the present invention includes a window channel assembly which is affixed to the inner surface of the rear sheet metal panel of the truck cab for supporting and guiding a transparent window which is vertically movable between a lowered position which opens, and a raised position which closes a window opening formed in the rear sheet metal panel of the cab. The transparent window is vertically movable by means of a remotely controlled power operated window regulator which is mounted on an upstanding support panel affixed to the floor of the truck cab. A mechanism closure panel is mounted on the floor of the truck cab and extends between the opposite side panels thereof for enclosing the regulator and protecting the transparent window in the lowered position thereof, and provides additional window supporting structure. The window channel assembly and the closure panel, in addition to accomplishing their respective functions as described above, are configured and affixed to the truck cab in a way which rigidifies the cab.

Thus, the apparatus of the present invention provides a remotely controlled power operated vertically movable rear window assembly for a truck cab by which the vehicle's operator may safely and conveniently reposition the rear window for ventilation purposes, or in cases where the truck is equipped with a camper, the operator can appropriately position the window to open or close the communication passage between the truck cab and the camper.

Accordingly, it is an object of the present invention to provide a new and useful rear window assembly for a truck cab.

Another object of the present invention is to provide a new and useful vertically movable rear window assembly for a truck cab which can be conveniently and safely repositioned by the operator of the vehicle.

Still another object of the present invention is to provide a new and useful remotely controlled power operated rear window assembly for a truck cab which can be conveniently and safely repositioned by the operator of the vehicle.

Still another object of the present invention is to provide a new and useful rear window assembly of the above described character which is configured to rigidify the rear sheet metal panel of the truck cab.

Yet another object of the present invention is to provide a new and useful rear window assembly of the above described type which includes a window channel assembly and mechanism closure panel which are mounted internally of the truck cab for rigidification thereof and for supportingly carrying a transparent window which is vertically movable in the window opening formed in the rear panel of the cab, with the window being moved remotely by a power operated regulator which is carried on an upstanding support panel affixed to the floor of the truck cab.

The foregoing and other objects of the present invention, as well as the invention itself, may be more fully understood from the following description when read in conjunction with the accompanying drawings.

BRIEF DESCRIPTION OF THE DRAWINGS

FIG. 3 is an enlarged fragmentary sectional view taken on the line 3—3 of FIG. 1.

FIG. 4 is a fragmentary rear elevational view of a truck cab with portions thereof broken away to illustrate the rear window assembly of the present invention which is mounted therein.

DESCRIPTION OF THE PREFERRED EMBODIMENT

Figure 1:
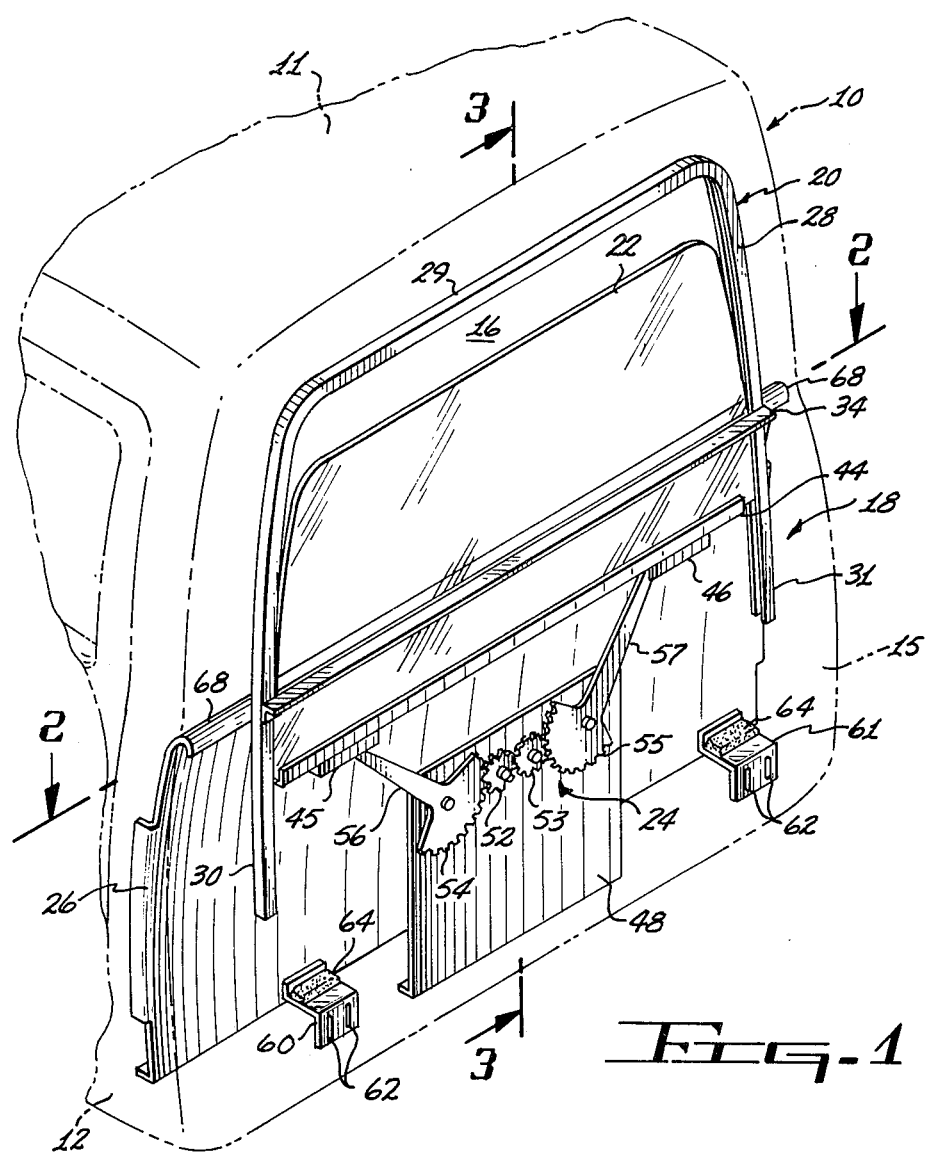
FIG. 1 is a fragmentary isometric view of the rear portion of a truck cab which is illustrated in phantom lines to show the rear window assembly of the present invention mounted therein.

Referring more particularly to the drawings wherein fragmentary portions of a typical type of truck cab are shown in the several views, with the truck cab being indicated generally by the reference numeral 10. The truck cab 10 has the usual roof panel 11, opposite side panels 12 and 13, floor panel 14 and rear panel 15 in which the rear window opening 16 is formed.

As will hereinafter be described in detail, a remotely controlled power operated rear window assembly is mounted within the truck cab 10 with that assembly being indicated generally by the reference numeral 18.

The remotely controlled power operated rear window assembly 18 is made up of several main elements or components which include a window channel assembly 20, a vertically movable transparent window 22, a power window regulator means 24, and a mechanism closure panel 26, all of which will now be described in detail.

The window channel assembly 20 is formed of a rigid channel member 28 such as of metal, which is bent along its length so as to be of generally U-shaped downwardly opening configuration having a bight portion 29 and an opposed pair of depending leg portions 30 and 31. The channel member 28 itself is of inwardly opening U-shaped cross section and is fitted with a suitable window gasket 32. The window channel assembly 20 also includes an angle brace 34 which is affixed, such as by welding, so as to be positioned transversely between the depending leg portions 30 and 31 at a location spaced from the bight portion 29 so as to provide upper and lower portions in the window channel assembly. The angle brace 34 has an elongated bumper gasket 35 suitably affixed thereto so as to slidingly bear against the transparent window 22 as will hereinafter be described in detail.

Figure 2:
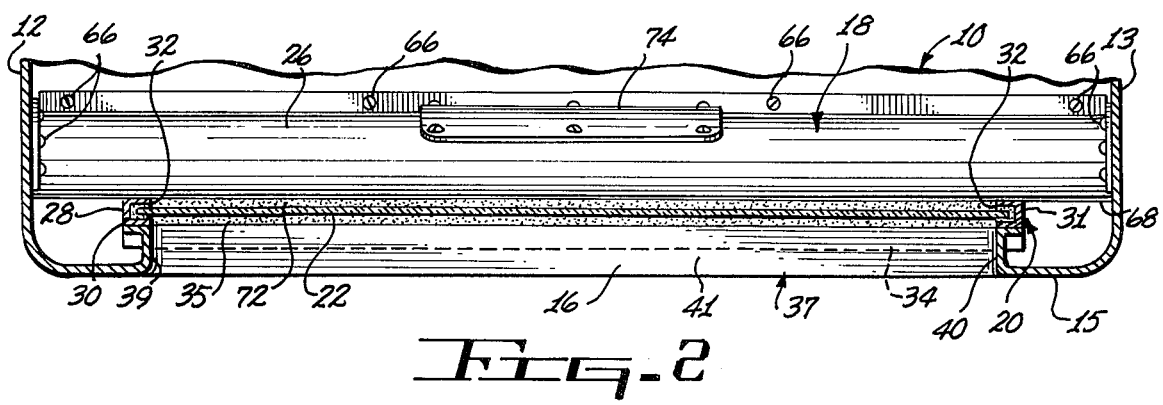
FIG. 2 is an enlarged fragmentary sectional view taken on the line 2—2 of FIG. 1.

As seen best in FIGS. 2 and 3, the window opening 16 provided in the rear panel 15 of the truck cab 10 is formed with an inwardly extending endless flange 37 having a top portion 38, opposite side portions 39 and 40, and a bottom portion 41. The window channel assembly 20 is affixed to the innermost end of the endless flange 37, such as by welding, so that the top portion 38 of the flange is affixed to the bight portion 29, the side portion 39 of the flange is affixed to the upper part of the leg 30, the side portion 40 of the flange is affixed to the upper part of the leg 31, and the bottom portion 41 of the flange is affixed to the angle brace 34.

Such affixation of the window channel assembly 20 to the endless flange 37 properly positions the channel assembly so that the upper portion thereof aligningly conforms to the window opening 16, and in addition will substantially increase the rigidity of the rear panel 15 of the truck cab 10 in the proximity of the rear window opening 16 thereof.

In the event that additional rigidification of the rear panel 15 of the truck cab 10 is needed or desirable, one or more cross braces 42 may be employed as seen in FIG. 3.

The transparent window 22 is vertically slidably supported between the depending legs 30 and 31 of the window channel assembly 20, and is movable between a raised position which completely closes the window opening 16, and a lowered position which opens that window opening. The transparent window 22 is provided with a frame 44 affixed to the lower edge thereof, and attached to the lower edge of the frame 44 is a pair of laterally spaced channel members 45 and 46 by which the power rear window regulator means 24 is coupled to the window 22 as will hereinafter be described.

A support panel 48 is affixed to the floor panel 14 of the truck cab 10 such as by welding, at a location spaced inwardly from the rear panel 15 thereof. The support panel 48 is upstanding from the floor panel 14 and has the power window regulator means 24 suitably mounted thereon.

As seen in FIGS. 1 and 3, the power window regulator means 24 includes a remotely energized reversible electric motor 50, which is suitably mounted on the upstanding support panel 14, and is coupled to an appropriate gear reduction unit 51 which is operatively connected to a pair of cooperating pinion gears 52 and 53 carried on the opposite side of the support panel 48. The pinion gears 52 and 53, respectively, operatively engage laterally spaced gear segments 54 and 55 which are pivotably mounted on the panel 48 and each of which is provided with a window drive arm 56 and 57 extending respectively therefrom. The terminal ends of the window drive arms 56 and 57 each have a roller 58 mounted thereon which couples the arms to the channel members 45 and 46 so that the rollers slidably operate in slots 59 formed in the channels. It will be apparent that when the electric motor 50 rotates in one direction, the pinion gears 52 and 53 will rotate in opposite directions and actuate the gear segments 54 and 55, and their drive arms 56 and 57 through reversely similar arcs. Thus, the terminal ends of the arms will travel in unison and since the rollers 58 operatively engage the channels 45 and 46 attached to the window 22, the window will be vertically slidingly driven in a direction which is determined by the rotational direction of the electric motor 50.

Although the transparent window 22 is shown in a partially open position, it will be understood that when closed, the upper and side edges of the window will be nestingly positioned in the window gasket 32 carried in the channel member 28 of the assembly 20. In that position, the gasket 32 forms a weathertight seal on the top and side edges of the window 22 and will also serve as an anti-rattler. When the window 22 is lowered to the open position (not shown) it will slidingly move downwardly in the depending legs 30 and 31 of the channel assembly 20 to a position where the top of the window is completely retracted from the window opening 16 of the truck cab 10.

In the lowered position of the transparent window 22, the frame 44 will rest upon a laterally spaced pair of angle brackets 60 and 61 which serve to support the weight of the window 22, and serves as stops which limit the downward movement of the window to a predetermined point. The angle brackets 60 and 61 are provided with slots 62 therein so that they are vertically adjustably mounted to the inner surface of the rear panel 15 of the truck cab 10 such as by suitable bolts 63, and each of the brackets 60 and 61 has an anti-rattler, shock absorber pad affixed thereto which is adapted to engage the lower edge of the frame 44 of the window 22.

The mechanism enclosure panel 26 extends upwardly from the floor panel 14 of the truck cab 10 and extends transversely between the opposed side panels 12 and 13 thereof. The enclosure panel 26 is suitably affixed to the side and floor panels 12, 13 and 14, respectively, such as with sheet metal screws 66 which, in addition to properly positioning the enclosure panel 26, will add rigidity to the truck cab 10. As shown, the mechanism enclosure panel 26 curves upwardly from the floor panel 14 and is provided with an elongated lip 68 along its upper edge which is formed so as to extend toward the rear panel 15 of the truck cab 10, and is located so as to lie in a horizontal plane which is common with the bottom portion 41 of the endless flange 37. Thus, the lip 68 and the bottom portion 41 cooperate to form a sill for the window opening 16, and that sill by virtue of the spacing between the lip and the bottom portion, defines an elongated slot 70 through which the transparent window 22 is vertically movable. The lip 68 of the enclosure panel 26 has a bumper gasket 72 affixed thereto which is spaced from and facing the bumper gasket 35 mounted on the angle brace 34. The bumper gaskets 35 and 72 form a sealing means in that they are disposed so as to be in sliding bearing engagement with the opposite surfaces of the window 22 thus serving as an anti-rattler and to form a substantially weathertight seal therewith.

The mechanism enclosure panel 26, as described above, will thus provide a portion of the structure which supports and guides the vertically movable transparent window 22, and encloses the window operating mechanisms to protect those mechanisms from dust, dirt and other foreign elements which could hamper its operation, and also protects the transparent window itself from accidental breakage when in the retracted or lowered position thereof. As seen in FIGS. 2 and 3, the enclosure panel 26 may be provided with an access panel 74 demountably attached thereto which simplifies motor lubrication and other servicing which may from time to time be needed.

As hereinbefore mentioned, the electric motor 50 is remotely energized, and as is well known in the art, such can be simply accomplished by mounting suitable controls (not shown) in any desired location which is convenient to the vehicle's operator, such as on the dashboard (not shown) of the truck cab 10. Then it is a simple matter to connect suitable wiring (not shown) between the truck's battery (not shown), the controls and the electric motor 50

It will now be seen that the above described window assembly 18 of the present invention is a mechanism which is of minimum complexity, is relatively simple to instal, adds structural rigidity to the truck cab 10, and provides a remotely controlled power rear window assembly for a truck cab.

While the principles of the invention have now been made clear in an illustrated embodiment, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A power operated rear window assembly for a truck cab having a floor panel, opposed side panels and a rear panel in the upper part of which a window opening is formed, the window opening having a top, bottom and opposed sides, said power operated rear window assembly comprising:
    (a) a window channel assembly of inverted generally U-shaped configuration having a bight portion and a pair of laterally spaced legs and having a brace affixed transversely between the legs to provide an upper portion and a lower portion;
    (b) said window channel assembly mountable on the inner surface of the rear panel of the truck cab with the upper portion thereof aligningly conforming with the window opening formed in the rear panel of the truck cab;
    (c) a transparent window mounted in said window channel assembly and movable therein between a raised position in the upper portion thereof and a lowered position in the lower portion thereof,
    (d) power operated window regulator means mountable in the truck cab and operatively connected to said transparent window for moving thereof;
    (e) a closure panel mountable in the truck cab for enclosing said power operated window regulator means and said transparent window in the lowered position thereof; and
    (f) sealing means on the brace of said window channel assembly and on said closure panel for sealingly bearing on opposite sides of said transparent window.

2. A power operated rear window assembly as claimed in claim 1 wherein said window channel assembly comprises:
    (a) an elongated rigid channel of U-shaped cross section bent along its length to provide the bight portion and the legs of said window channel assembly; and
    (b) a window channel gasket mounted in said rigid channel and extending the length thereof.

3. A power operated rear window assembly as claimed in claim 1 wherein said power operated window regulator means is mounted on a support panel which is mountable on the floor panel of the truck cab and upstanding therefrom.

4. A power operated rear window assembly as claimed in claim 1 wherein said power operated window regulator means includes a remotely energizible reversible electric motor.

5. A power operated rear window assembly as claimed in claim 1 and further comprising a laterally spaced pair of angle brackets vertically adjustably mountable on the inner surface of the rear panel of the truck cab for supportingly engaging the lower edge of said transparent window in the lowered position thereof.

6. A power operated rear window assembly as claimed in claim 1 wherein said closure panel is mountable on the floor panel of the truck cab and is attachable to the opposed side panels of the truck cab, said closure panel having a lip formed along the upper edge thereof on which a portion of said sealing means is mounted.

7. A power operated rear window assembly as claimed in claim 6 wherein said closure panel further comprises an access panel demountably attached thereto.

8. A power operated rear window assembly as claimed in claim 1 wherein said sealing means comprises:
- a) an elongated gasket mounted on the brace of said window channel assembly; and
- (b) another elongated gasket mounted on the top edge of said closure panel.

* * * * *